United States Patent [19]

Yamane et al.

[11] Patent Number: 5,459,803
[45] Date of Patent: Oct. 17, 1995

[54] QUARTZ-BASED OPTICAL FIBER WITH A LENS AND ITS MANUFACTURING METHOD

[75] Inventors: Motohiro Yamane; Yoshiharu Taga, both of Tokyo, Japan

[73] Assignee: The Furukawa Electric Co., Ltd., Tokyo, Japan

[21] Appl. No.: 196,578

[22] Filed: Feb. 15, 1994

[30] Foreign Application Priority Data

Feb. 18, 1993 [JP] Japan .................................. 5-028836
May 14, 1993 [JP] Japan .................................. 5-112914

[51] Int. Cl.⁶ ........................................ G02B 6/32
[52] U.S. Cl. ......................... 385/33; 385/142; 385/144
[58] Field of Search ............................ 385/31, 33, 15, 385/38, 88, 85, 123, 141, 142, 144

[56] References Cited

U.S. PATENT DOCUMENTS

| | | | |
|---|---|---|---|
| 4,915,474 | 4/1990 | Klein et al. | 385/123 |
| 4,946,239 | 8/1990 | Garmon | 385/124 |
| 5,011,254 | 4/1991 | Edwards et al. | 385/33 |
| 5,013,452 | 5/1991 | Bellos et al. | 201/708 |
| 5,037,174 | 8/1991 | Thompson | 385/33 |
| 5,117,473 | 5/1992 | Pan | 385/33 |
| 5,177,806 | 1/1993 | Abbott et al. | 385/88 |
| 5,247,597 | 9/1993 | Blacha et al. | 385/88 |

FOREIGN PATENT DOCUMENTS

| | | |
|---|---|---|
| 54-20747 | 2/1979 | Japan . |
| 3-269403 | 12/1991 | Japan . |
| 2000119 | 1/1979 | United Kingdom . |
| 2242755 | 10/1991 | United Kingdom . |

OTHER PUBLICATIONS

H. Honmou et al; C–259 Efficient Optical Coupling Between Laser Diode and Single Mode Fiber with Heat Treated Hemispherical End; p. 4–301; IEICE (Institute of Electronics, Information & Communication Engineers); Tokyo, Japan; Mar. 15, 1992.

M. C. Farries; Fiber Fresnel Phaseplates with Efficient Coupling to Semiconductor Lasers and Low Reflective Feedback pp. 291–294; ECOC (European Conference Optical Communication), Northants, England; 1990.

Applied Optics, vol. 21, No. 19, Oct. 1, 1982, pp. 3470–3474 G. Eisenstein, et al, "Chemically Etched Conical Microlenses for Coupling Single Mode Lasers into Single Mode Fibers".

Primary Examiner—Akm E. Ullah
Assistant Examiner—John Ngo
Attorney, Agent, or Firm—Frishauf, Holtz, Goodman, Langer & Chick

[57] ABSTRACT

A quartz-based optical fiber with a lens, wherein a lens shaped in a curved surface is directly formed on an end surface, and its manufacturing method are provided, the quartz-based optical fiber with a lens having a lens section formed by a projecting core shaped in a curved surface on the end surface, the lens section being produced by immersing the end surface section of the quartz-based optical fiber, which consists of a core and a clad having a composition in which the etching speed is higher than that of the core when a hydrofluoric acid solution is applied, in the hydrofluoric acid solution to cause a core shaped in a truncated cone to project from the end surface of said quartz-based optical fiber, then heating and melting the core shaped in the truncated cone and the vicinity thereof, thus changing the truncated cone shape into a curved surface shape.

15 Claims, 6 Drawing Sheets

QUARTZ-BASED OPTICAL FIBER WITH A LENS AND ITS MANUFACTURING METHOD

BACKGROUND OF THE INVENTION

1. Field of the Invention

The present invention relates to a quartz-based optical fiber with a lens and its manufacturing method, and more particularly, to a quartz-based optical fiber with a lens which feature less aberration of the lens and higher efficiency in coupling to a semiconductor laser and which permits easy positioning of the lens and the semiconductor laser when aligning with the semiconductor laser, and its manufacturing method.

2. Prior Art

A conventional luminous element module to be incorporated in an optical communications system has a lens which is installed between a semiconductor laser, which is a light source, and a quartz-based optical fiber to condense the laser beam into a core of the quartz-based optical fiber. The module is fabricated by aligning the lens, the semiconductor laser, and the core of the quartz-based optical fiber with one another to ensure maximum coupling power between the semiconductor laser and the quartz-based optical fiber, because it is necessary to maximize the efficiency of the coupling between the semiconductor laser and the quartz-based optical fiber.

Recently, a quartz-based optical fiber with a lens, wherein the lens section is formed directly on the end surface of the quartz-based optical fiber, has been proposed. Since this quartz-based optical fiber is equipped with a lens function on its own end surface, no lens is required in fabricating the above-mentioned module. This results in such advantages as a smaller number of parts and less man-hours for the aligning work, contributing to reduced cost.

Figure 1:
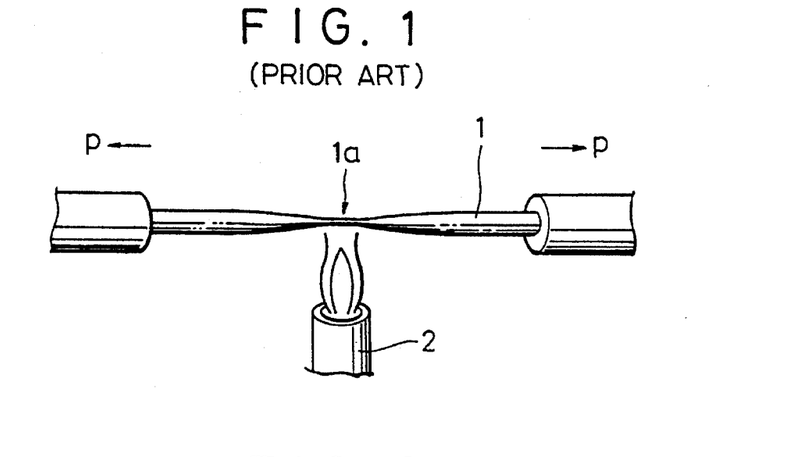
FIG. 1 is a perspective view which shows a state wherein a quartz-based optical fiber is being melted and stretched.

The quartz-based optical fiber with a lens described above is fabricated, for example, as set forth below. As shown in FIG. 1, a quartz-based optical fiber 1 with its covered portion peeled and exposed is locally heated with a heating means 2 such as a burner, for example, and the heated portion is stretched by pulling it in the directions of arrows "p." The stretching is stopped when a diameter of a stretched section 1a of the quartz-based optical fiber reaches about 10 µm or less, then the stretched section is cut with a cutter, for example.

Figure 2:
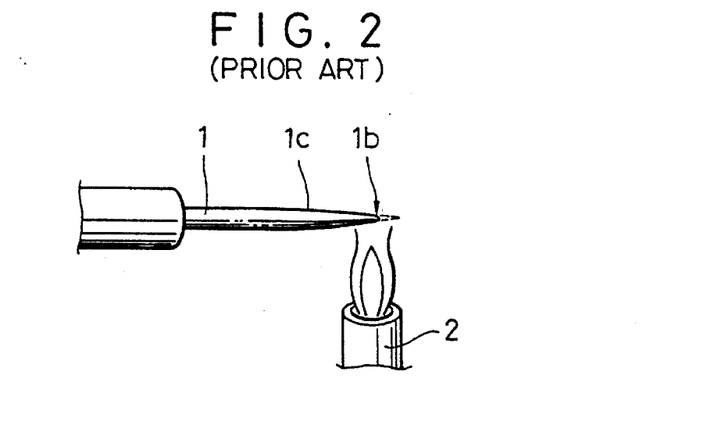
FIG. 2 is a perspective view which shows a state wherein the cut tip of the quartz-based optical fiber is being melted to form a lens section on the tip.

Then, as shown in FIG. 2, an end section 1b of the quartz-based optical fiber, which has been cut, is heated with a burner 2 to melt it. At this time, the melting end 1b forms a spherical surface due to surface tension. As a result, a quartz-based optical fiber with a lens, the end 1b thereof forms a very small spherical lens, is obtained.

Figure 3:
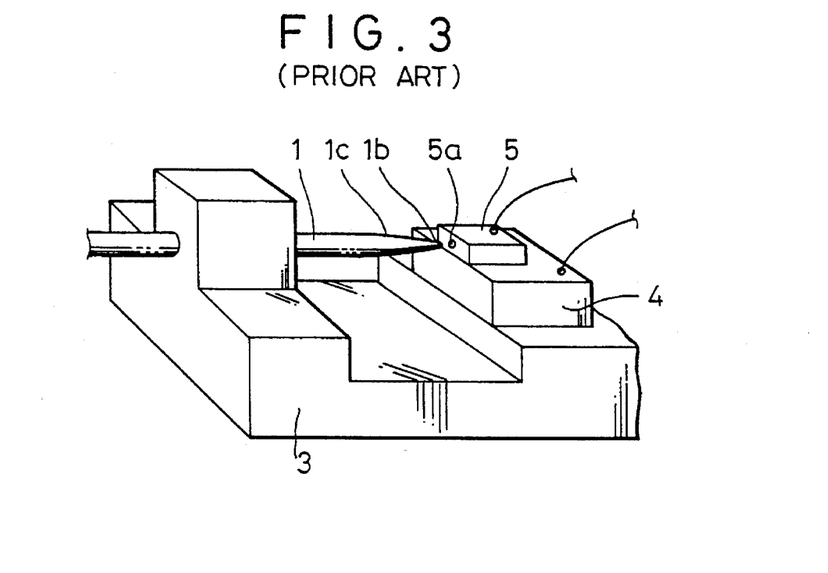
FIG. 3 is a perspective view which shows a state wherein a quartz-based optical fiber with a lens is being coupled to a semiconductor laser chip.

To fabricate an optical module by coupling this quartz-based optical fiber with a lens to a semiconductor laser, as shown in FIG. 3, for instance, a quartz-based optical fiber with a lens is disposed on one side of a fixing base 3 and a semiconductor laser chip 5 such as a LD (laser diode) is disposed on the other side of the fixing base 3, then these two are coaxially brought closer toward each other until the distance between the end section (lens section) 1b of the quartz-based optical fiber with a lens 1 and a luminous surface 5a of the semiconductor laser chip 5, which normally has a diameter of approximately 1 µm, reaches 5 to 10 µm, thus aligning them to ensure a maximum optical coupling power. By using this aligning mode, a coupling efficiency of about 20% to 30% is obtained between the quartz-based optical fiber with a lens 1 and the semiconductor laser chip 5.

In the case of the quartz-based optical fiber with a lens manufactured in the method described above, the diameter of a portion from the lens section 1b at the end to the unstretched portion is tapered. The tapered portion 1c is fairly long, usually a few millimeters, although the length depends on the stretching condition.

Hence, as shown in FIG. 3, when the quartz-based optical fiber with a lens 1 is fixed on one side of the fixing base 3, there will be a fair distance from the fixed section to the luminous surface 5a of the semiconductor laser chip 5. For this reason, if an external force such as vibration is applied to the fixing base 3, the end section (lens section) 1b in the state of correct alignment is displaced with a large vibration width, occasionally causing misalignment between the lens section 1b and the luminous surface 5a. If such misalignment occurs in a fabricated optical module, then the coupling efficiency varies when the optical module is in operation.

Further, in the case of this quartz-based optical fiber with a lens 1, the lens 1b is positioned as a very small sphere on the end of a long tapered section. At the time of fabricating the optical module, to align the lens section 1b with the luminous surface 5a, the leading end of the lens 1b serves as a positioning reference. However, since the end consists of an extremely small curved surface, there is a problem in that it is difficult to clearly identify the position of the end. This occasionally causes the lens section 1b to come into contact with the luminous surface 5a, breaking the luminous surface 5a, when aligning the lens section 1b with the luminous surface 5a.

Furthermore, the method described above requires high skill for setting the conditions for locally heating the quartz-based optical fiber with a lens and the stretching condition. Therefore, the method can hardly be accepted as a method for mass-producing quartz-based optical fibers with lenses with a stable yield.

Under the patent registration No. 1399345, the following quartz-based optical fiber with a lens is described:

The outer peripheral section of a quartz-based optical fiber, which has been machined into a conical shape, is etched with a hydrofluoric acid aqueous solution to cause a conical core to be exposed on one terminal. The top section of the conical core is heated to form the top section into a spherical lens.

Like the one made by melting and stretching, this quartz-based optical fiber with a lens also uses a very small spherical lens formed on the top section as the positioning reference for aligning with the luminous surface of a semiconductor laser. It is, therefore, very difficult to identify the end of the lens, causing the luminous surface to easily break.

Further, "Fibre fresnel Phaseplates with efficient coupling to semiconductor lasers and low reflective feedback" of ECOC, 1990, pp 291 proposes a quartz-based optical fiber with a lens which has a truncated-cone-shaped lens section directly formed on an end surface of a quartz-based optical fiber by immersing the end surface of the optical fiber in a hydrofluoric acid solution.

In this optical fiber, however, the lens section has a larger aberration which results in a lower coupling efficiency, approximately 60%, when it is coupled to a semiconductor laser.

Furthermore, "High-efficiency optical coupling of a single-mode fiber with a heat-treated spherical point" of C-259, Spring Meeting of Electronic Information Communication Society proposes a quartz-based optical fiber with a lens wherein a lens section of the quartz-based optical fiber with a lens proposed in the above-said report is heated by electric discharge to provide the lens section with a smooth surface.

This optical fiber also suffers from a large aberration of the lens section and a low coupling efficiency, approximately 60%, when it is coupled to a semiconductor laser.

Yet further, the laid-open publication of JP patent application No. H3-269403 discloses a method for forming a lens section on the tip of a quartz-based optical fiber by machining the end while rotating the optical fiber around its axis.

However, in a quartz-based optical fiber with a lens manufactured by this method, misalignment between the center of the axial rotation and the center of the core causes decentering between the formed lens section and the core, resulting in a low efficiency of coupling to a semiconductor laser. In addition, the manufacturing yield is low, unavoidably leading to higher cost.

OBJECTS AND SUMMARY OF THE INVENTION

An object of the present invention is to provide a quartz-based optical fiber with a lens which is free of any tapered portion observed in one manufactured by melting and stretching and which uses an end surface of the optical fiber directly as its lens section.

Another object of the present invention is to provide a quartz-based optical fiber with a lens which is free of decentering between the lens section and the core, and which features a lens section with low aberration and high efficiency of coupling to a semiconductor laser chip.

A further object of the present invention is to provide a quartz-based optical fiber with a lens which makes it possible to easily identify the position of an end surface of the optical fiber at the time of aligning with the semiconductor laser, thus preventing the semiconductor laser from coming into contact with the lens section and therefore protecting a luminous surface from damage at the time of aligning the lens section with a luminous surface.

Yet another object of the present invention is to provide a quartz-based optical fiber with a lens which is capable of maintaining the efficiency of coupling between a lens section and a luminous surface of a semiconductor laser chip in a fabricated optical module once the lens section and the luminous surface have been aligned.

A still further object of the present invention is to provide a quartz-based optical fiber with a lens and its manufacturing method which permits easy forming of lens sections and good mass-producibility.

To fulfill the objects described above, according to the present invention, a quartz-based optical fiber with a lens is provided, wherein a core, which is comprised of a quartz-based glass having a slower etching speed with respect to a hydrofluoric acid-based mixture solution than that of a quartz-based glass constituting a clad, the core, which forms a lens section with a curved surface, projecting from an end surface, and at least one portion of an end surface of the clad being a flat surface which crosses at right angles to the axial length direction.

Further, a quartz-based optical fiber with a lens is provided, which preferably has a lens section wherein a boundary between the core and the clad has also a curved surface.

Still further, a quartz-based optical fiber with a lens is provided, wherein an outer peripheral section, which comprises a quartz-based glass having a lower etching speed with respect to a hydrofluoric acid-based mixture solution than that of a quartz-based glass constituting a clad, is formed as one body with the outside of the aforesaid clad, and an end surface of the outer peripheral end section projects farther than the lens section having the aforesaid curved surface.

Furthermore, according to the present invention, a manufacturing method for quartz-based optical fibers with lenses is provided, the method comprising a step wherein an end surface of the quartz-based optical fiber, which comprises a core, and a clad which has a composition for ensuring a higher etching speed with respect to a hydrofluoric acid-based mixture solution than that of the core, is immersed in the hydrofluoric acid-based mixture solution to form a projecting core of a truncated cone shape on the end surface of the aforesaid quartz-based optical fiber, and a step wherein the aforesaid core of the truncated cone shape and its vicinity is heated and melted to form at least the section of the truncated cone shape into a curved surface.

DETAILED DESCRIPTION OF THE INVENTION

Figure 4:
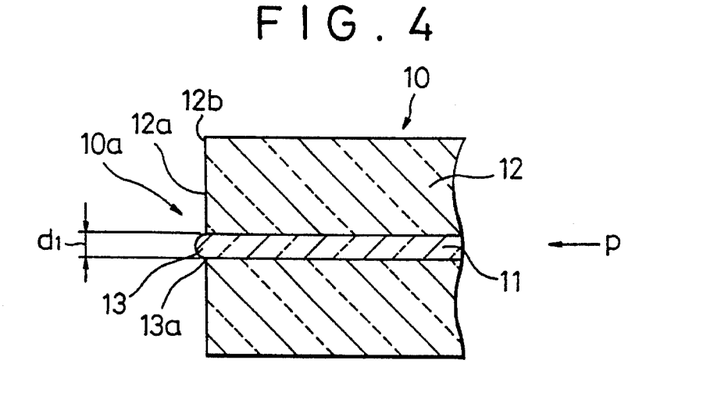
FIG. 4 is a cross-sectional view which shows an example of the quartz-based optical fiber with a lens according to the present invention.

An example of the end surface section of the quartz-based optical fiber with a lens according to the present invention is shown in FIG. 4.

In FIG. 4, an optical fiber 10 comprises a core 11 made of a quartz-based glass and a clad 12 made of another quartz-based glass which surrounds the core. The core 11 is comprised of a quartz-based glass which has a lower etching speed with respect to a hydrofluoric acid-based mixture solution, which will be discussed later, than that of the quartz-based glass constituting the clad 12.

An end surface 10a of the optical fiber 10, namely, the end surface to be coupled to a semiconductor laser chip, crosses at right angles to an axial length direction "p". On the end surface, the core 11 projects in a curved surface shape, the projecting part forming a lens section 13. An end surface 12a, which extends from a base 13a of the lens section 13, which is the boundary area between the core 11 and clad 12, to a peripheral section 12b of the clad 12, is a flat surface.

Namely, in this optical fiber, the clad end surface 12a is flat and perpendicular to the axial direction p, and only the end of the core 11, which is curved in shape and serves as the lens section 13, projects from the flat end surface 12a to a predetermined height.

Hence, in this optical fiber, an effective diameter d1 of the lens section 13 is nearly the same as the diameter of the core 11.

Figure 5:
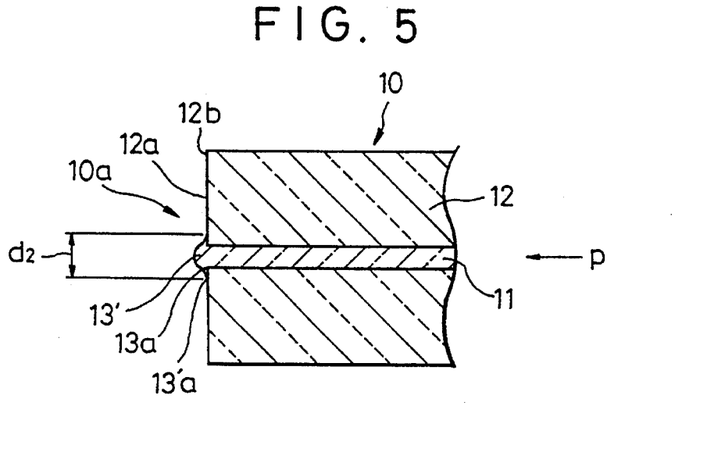
FIG. 5 is a cross-sectional view which shows an example of another quartz-based optical fiber with a lens according to the present invention.

FIG. 5 is the cross-sectional view which shows the end surface of another optical fiber. This optical fiber is identical to the optical fiber of FIG. 4 in that the end surface 10a has a projecting lens section 13' which is shaped in a curved surface.

The lens section 13', however, is shaped in the curved surface which extends to an end surface 12'a of the clad 12 beyond a boundary area 13a between the core 11 and the clad 12. In other words, the boundary area 13a between the core 11 and the clad 12 is also shaped in the curved surface.

An end surface 12'a which extends from a base 13'a of the lens section 13' to the peripheral section 12b of the clad 12 is a flat surface.

Therefore, in this optical fiber, an effective lens diameter d2 of the lens section 13' is slightly larger than the diameter of the core.

Figure 6:
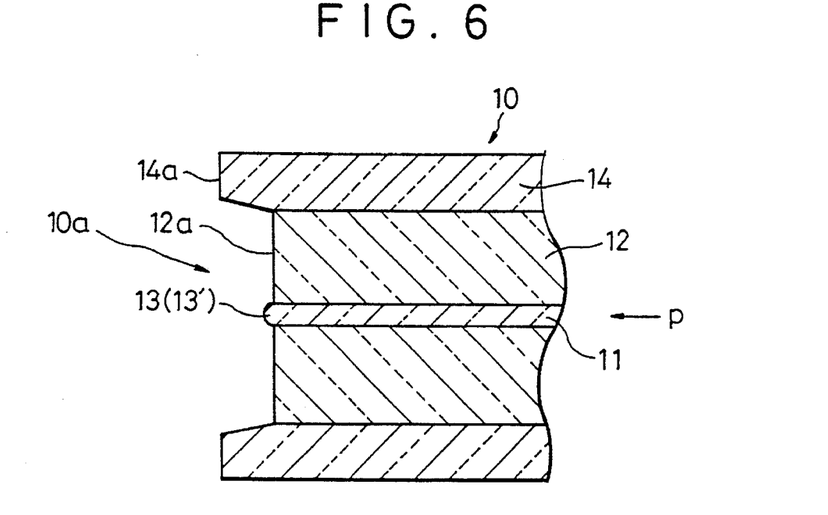
FIG. 6 is a cross-sectional view which shows an example of still another quartz-based optical fiber with a lens according to the present invention.

FIG. 6 is the cross-sectional view which shows an end surface of still another quartz-based optical fiber with a lens.

In the case of this quartz-based optical fiber with a lens 10, around the clad 12 of the quartz-based optical fiber with a lens shown in FIG. 4 and FIG. 5 is provided with an outer peripheral section 14 made of a quartz-based glass which has a lower etching speed with respect to a hydrofluoric acid-based mixture solution than that of the clad 12. Preferably, the outer peripheral section 14 is made of the same quartz-based glass as that of the core 11. An end surface 14a of the outer peripheral section 14 projects more than the lens section 13 (13'). In other words, the lens section 13 (13') is more receded than the end surface 14a of the outer peripheral section 14.

The lens section 13 (13') is preferably receded 20 μm or less from the end surface 14a. This is because the coupling efficiency obtained when coupling with a semiconductor laser lowers if the distance is larger than 20 μm.

In none of the quartz-based optical fibers with lenses shown in FIG. 4, FIG. 5, and FIG. 6, the end portion to be coupled to the semiconductor laser is tapered; the lens section is formed on the end surface 10a itself which crosses at right angles to the axial length direction "p".

Accordingly, even when the optical fibers are coupled to the semiconductor laser chip 5 in the manner shown in FIG. 3, the distance between the fixing base 3 and the luminous surface 5a of the semiconductor laser chip 5 is short enough to effectively prevent axial decentering which tends to occur at the time of coupling to an optical fiber which has a tapered portion.

Further, both lens sections 13 and 13' consist of cores which are shaped directly into curved surfaces to form the lenses according to a method to be discussed later; therefore, no decentering exists between the lenses and the cores. Further, since at least the cores are curved as a whole, aberration of the lenses is small and the coupling efficiency obtained when the lenses are coupled to semiconductor lasers is high.

Furthermore, in the case of the quartz-based optical fibers with lenses shown in FIG. 4 and FIG. 5, when the end surfaces are observed sideways, the lens section 13 (13'), the diameter of which is usually about one tenth of that of the clad, projects to a prescribed height at the center of the flat clad end surface 12a (12'a), the diameter of which is usually 100 μm or more.

Thus, when aligning with the luminous surface of the semiconductor laser chip, the peripheral section 12b of the clad can be used as the positioning reference without the need of positional adjustment between the lens section 13 (13') and the luminous surface with the end of the lens section 13 (13') serving as the positioning reference. This makes the aligning work extremely easier than it used to be.

Figure 7:
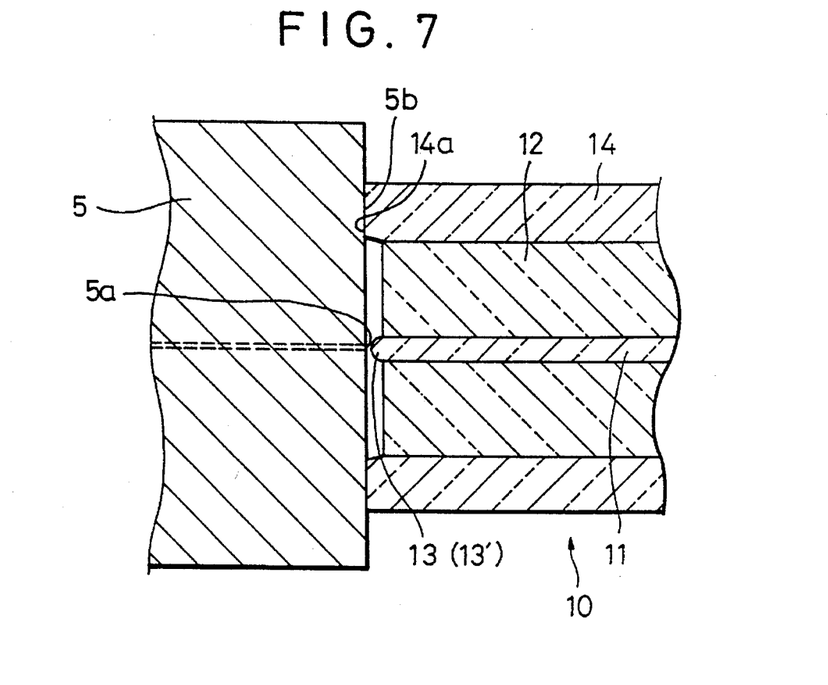
FIG. 7 is a cross-sectional view which shows a state wherein the quartz-based optical fiber with a lens of FIG. 6 is being coupled to the semiconductor laser chip.

In addition, when coupling the quartz-based optical fiber with a lens 10 shown in FIG. 6 to the semiconductor laser chip, the lens section 13 (13') does not contact the luminous surface 5a even if the end surface 14a of the outer peripheral section 14 is directly applied to an end surface 5b of the semiconductor laser chip 5 as shown in FIG. 7 since the lens section 13 (13') is located in a more recessed position than the end surface 14a of the outer peripheral section 14. Hence, the luminous surface 5a is fully protected from damage when aligning the lens section 13 (13') with the luminous surface 5a.

Moreover, fixing the quartz-based optical fiber with a lens 10 and the semiconductor laser chip 5 in the aligned state allows the lens section 13 (13') and the luminous surface 5a to continue to maintain their constant positional relationship when the assembled optical module works. For this reason, the coupling efficiency stays unchanged when the optical module works.

The quartz-based optical fibers with lenses according to the present invention are manufactured as follows:

First, quartz-based optical fibers as described below are prepared:

The first optical fiber has a core comprised of a pure quartz glass ($SiO_2$) and a clad which surrounds the core and which is made of a glass composed of a glass doped with a fluorine component.

The second optical fiber has a core comprised of a glass which is composed of quartz glass doped with $GeO_2$ and a clad comprised of quartz glass or a glass which is composed of quartz glass doped with a fluorine component.

Using these optical fibers, the quartz-based optical fibers with lenses shown in FIG. 4 and FIG. 5 are manufactured.

In the third optical fiber, the aforesaid first optical fiber and the second optical fiber are surrounded with outer peripheral sections made of a quartz-based glass which has a lower etching speed with respect to a hydrofluoric acid-based mixture solution than that of the clads of the optical fibers.

To be more specific, they are an optical fiber consisting of the first optical fiber wrapped with an outer peripheral section made of a pure quartz glass (the same material as that used for the core) and an optical fiber consisting of the second optical fiber wrapped with an outer peripheral section made of a quartz-based glass which is composed of a quartz glass with doped $GeO_2$ (the same material as that used for the core).

By using this quartz-based optical fiber, the quartz-based optical fiber with a lens shown in FIG. 6 can be manufactured.

In the first optical fiber, the quantity of the fluorine component doped in the clad is adjusted to cause a proper difference in etching speed between the clad and the core when the end surface of the optical fiber is immersed in the hydrofluoric acid-based mixture solution so that the resulting core shaped into a truncated cone exhibits a proper lens function and it is also adjusted so that the optical transmission characteristics of the optical fiber is not adversely affected. It is normally desirable to adjust the doping quantity so that the difference in refractive index is about 0.3 to 0.4%.

The clad may be doped with a phosphoric component in place of the above-mentioned fluorine component or it may be produced by adding the phosphoric component in addition to the fluorine component.

In the case of the second optical fiber, as in the first optical fiber, the quantity of $GeO_2$ doped into the core is adjusted to cause a proper difference in etching speed between the clad and the core when the end surface of the optical fiber is immersed in the hydrofluoric acid-based mixture solution so that the resulting core shaped into a truncated cone exhibits a proper lens function and it is also adjusted so that the optical transmission characteristics of the optical fiber is not adversely affected. To be specific, the doping quantity should be adjusted so that the difference in refractive index between the core and the clad is about 0.3 to 0.4%.

In the second optical fiber, when the clad is produced using a glass which is composed of quartz glass doped with the fluorine component, the quantity of the fluorine component for the doping is set within a range that does not adversely affect the optical transmission characteristics.

The optical fibers provided with such properties are, mirror-cut at right angles to the axial length direction, for example. Further, the cut surfaces are polished, for instance, so that the clad surfaces and the core surfaces are smooth and flush evenly, then the end surface sections are immersed in the hydrofluoric acid-based mixture solution.

The first optical fiber is immersed in the hydrofluoric acid aqueous solution, while the second optical fiber is immersed in a hydrofluoric acid mixed solution which will be discussed later.

The third optical fiber is immersed in the hydrofluoric acid aqueous solution or the hydrofluoric acid mixed solution depending on whether its core and clad are the same type as those of the first optical fiber or the second optical fiber.

At this time, the temperature of the hydrofluoric acid aqueous solution or the hydrofluoric acid mixed solution should be controlled to 20° to 25° C. and the immersion time to about 30 to 60 minutes. The solutions should constantly be stirred or circulated.

The concentration of the hydrofluoric acid in the hydrofluoric acid aqueous solution to be used should be appropriately decided according to the etching speeds required for the clad and the core; the concentration should normally be 10 to 50 mol %.

The hydrofluoric acid mixed solution may be a mixed solution of hydrofluoric acid aqueous solution and an ammonium fluoride aqueous solution, for example. In such a mixed solution, the concentration of the hydrofluoric acid should be adjusted to 10 to 50 mol %.

In the case of the first optical fiber and the second optical fiber, immersing the end surface portions of the optical fibers in the hydrofluoric acid aqueous solution causes the clad and the core to be etched and dissolved.

At this time, the whole end surface of the clad is uniformly etched in the axial length direction; therefore, the original condition of the end surface remains unchanged after etching. In other words, the flatness of the end surface of a clad remains intact.

On the other hand, the core is simultaneously subjected to a process for etching in the optical axis direction of the optical fiber to shorten the whole core and a process for etching in the radial direction of the core to uniformly thin the whole core, the etching speed being lower than that of the clad. Therefore, when a specified time elapses, the core on the end surface of the optical fiber projects in a truncated cone shape.

Regarding the first optical fiber which uses a quartz glass for its core and a glass composed of quartz glass doped with fluorine for its clad, the state described above is shown in FIG. 8. Specifically, a flat clad end surface 12a, which crosses at right angles to the axial length direction, and a core 11' having the truncated cone shape and projecting at the center of the end surface 12a are formed on the end surface of the optical fiber 10.

Figure 8:
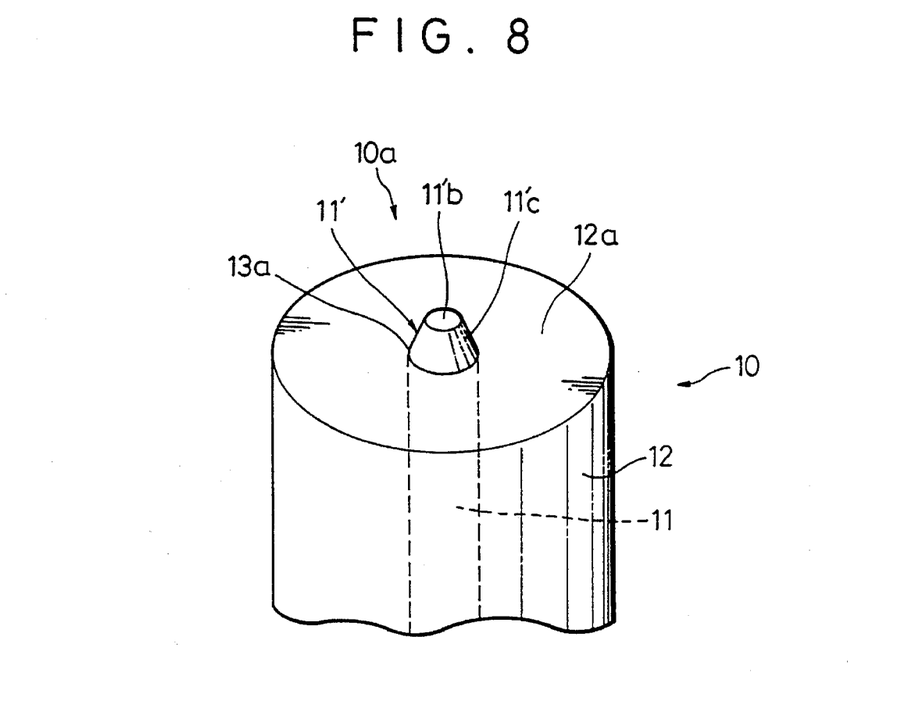
FIG. 8 is a perspective view showing a core of a truncated cone shape which has been formed on an end surface after the core has been subjected to the treatment with a hydrofluoric acid solution.

The core 11' of the truncated cone shape is the core 11 which has been changed in shape and it shares the same material as the core. In addition, the axial center of the core 11' of the truncated cone shape is the axial center of the core 11; therefore, the core 11' of the truncated cone shape and the core 11 are not decentered.

In the core 11' of the truncated cone shape, the base 13a, namely, the boundary area between the core 11 and the clad 12 has the same diameter as that of the core 11, and a top section 11'b is a flat surface which is parallel to the clad end surface 12a. Further, the boundary between the clad end surface 12a and a slant surface 11'c and the boundary between the top section 11'b and the slant surface 11'c are both shaped in square edges.

The whole truncated cone shape slightly changes depending on the composition of the core and the clad or the concentration of the hydrofluoric acid of the hydrofluoric acid aqueous solution or hydrofluoric acid-based mixture solution. For instance, when the core is made of a pure quartz glass, the apex angle of this truncated cone shape falls within a range of 100° to 120°.

In the case of the second optical fiber, the end surface of the optical fiber is immersed in the aforesaid mixed solution to shape the core into a truncated cone. At this time, increasing the concentration ratio of the ammonium fluoride decreases the tilt angle (apex angle) of the resulting truncated cone 11', making the entire shape acute. Thus, the core can be shaped into a desired truncated cone by properly setting the concentration ratio.

Figure 9:
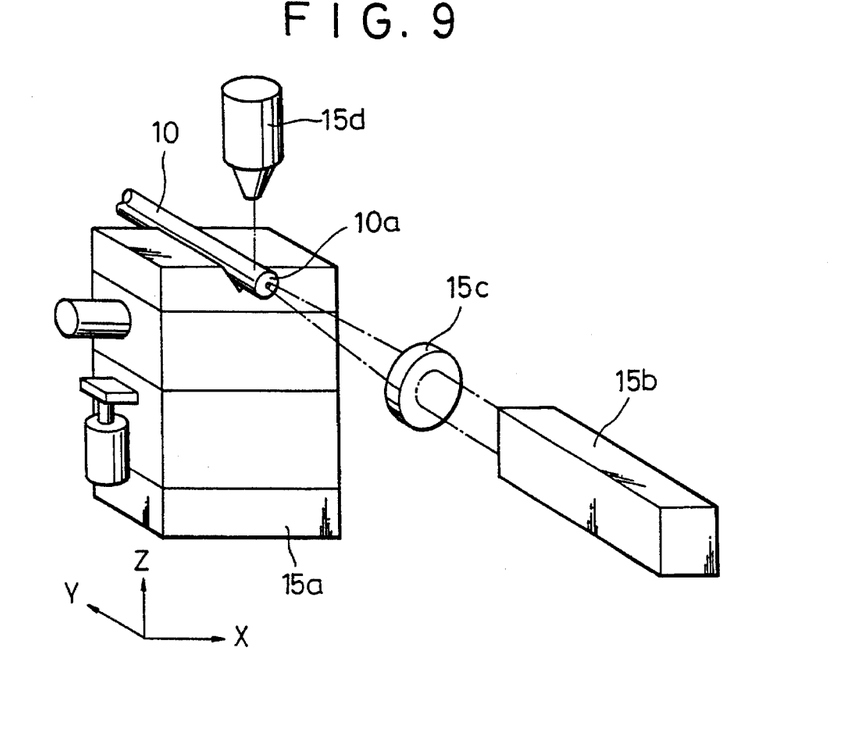
FIG. 9 is a perspective view which shows a state wherein the core of the truncated cone shape of FIG. 8 is being heated and melted.

Then, the optical fiber 10 having the end surface structure shown in FIG. 8 is placed on a positioning stage 15a which enables fine adjustment of movement in three-dimensional directions, X, Y, and Z as shown in FIG. 9. And a laser beam from a carbon dioxide gas laser oscillator 15b, for example, is narrowed down by a converging lens 15c, then the converged laser beam is irradiated to the end surface 10a of the disposed optical fiber 10 to heat the core 11' shaped in the truncated cone and the clad end surface 12a near the core shown in FIG. 8. At this time, the surface exposed to the laser beam is accurately observed by an observing means 15d used for positioning.

Being subjected to the irradiation of the laser beam, the core 11' shaped in the truncated cone softens or partially melts. Hence, the base 13a of the truncated cone shape and the top 11'b shown in FIG. 8 are rounded and the whole shape is changed into a curved surface without causing any significant change in the entire shape of the projection on the clad end surface 12a.

Figure 10:
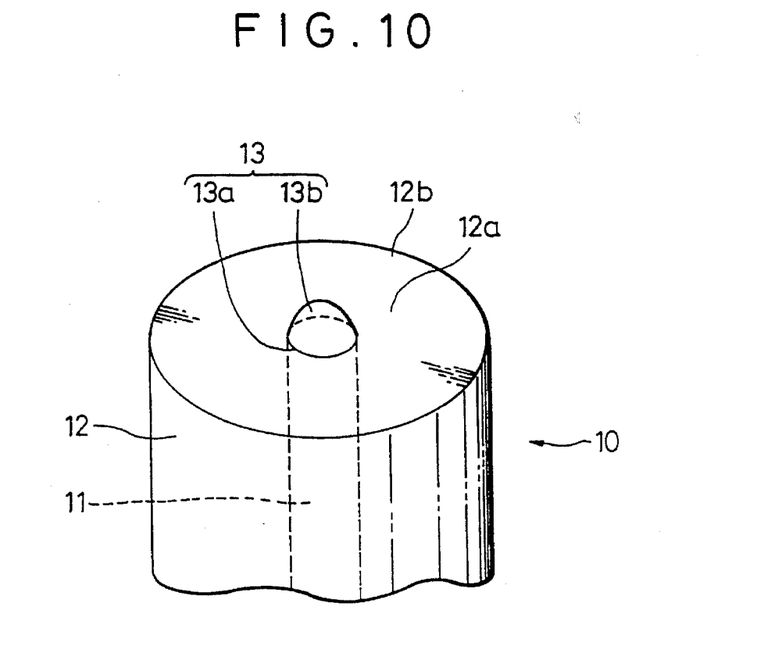
FIG. 10 is a perspective view which shows an example of a lens section in the quartz-based optical fiber with a lens according to the present invention.

In this case, if the laser beam is considerably narrowed down to irradiate the beam centering around the top 11'b of the core 11' shaped in the truncated cone, then the base 13a of the truncated cone does not proceed much, causing the top 11'b to be preferentially shaped into a curved surface. As a result, as shown in FIG. 10, the diameter of the base 13a is almost equal to that of the core 11 and a top 13b is shaped into a lens section 13, the shape thereof is similar to a spherical surface.

Since the clad end surface 12a is not subjected to the irradiation of the laser beam, it remains a flat surface which crosses at right angles to the axial length direction over the area from the base 13a of the lens section 13 to the peripheral section 12b of the clad end surface 12a.

This means that the projecting lens section 13, the effective lens diameter d1 thereof is approximately identical to the diameter of the core and which is shaped in a curved surface as a whole, is formed on the end surface of the optical fiber as shown in FIG. 4.

Figure 11:
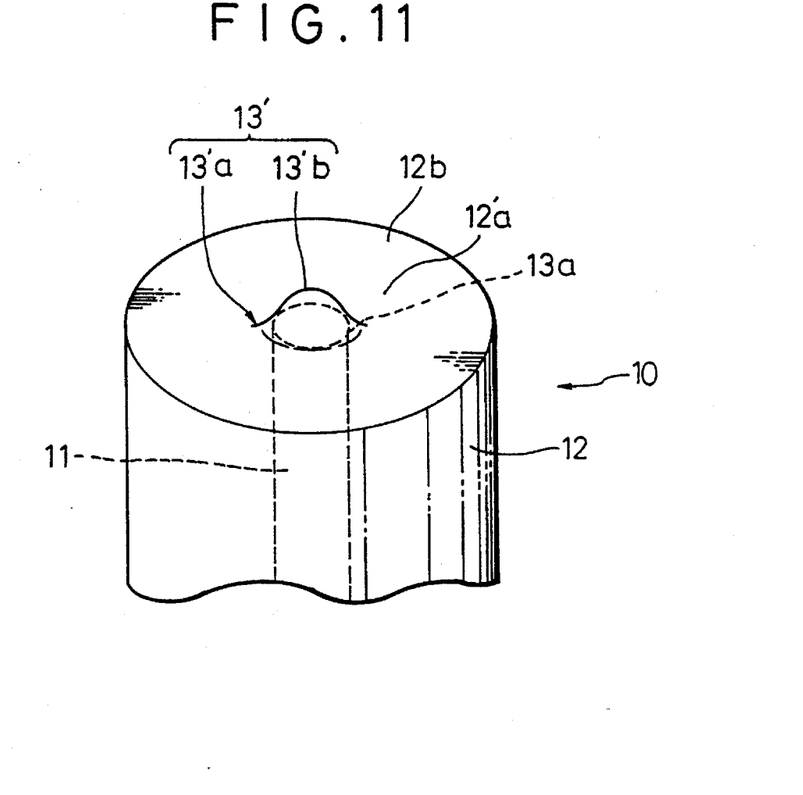
FIG. 11 is a perspective view which shows another lens section in the quartz-based optical fiber with a lens according to the present invention.

On the other hand, if the narrowing-down of the laser beam is decreased to irradiate the laser beam over a broader area including the entire lens section 13 shaped in the truncated cone, then both the tops 13b and the base 13a of the lens 13 section shaped in the truncated cone will melt to be formed into a lens 13' which is shaped like a conical curved surface similar to a spherical surface as a whole with its foot extending from the boundary 13a between the core 11 and the clad 12 to the clad end surface 12'a as shown in FIG. 11. However, the end surface 12'a extending from the foot 13'a of the lens section 13' to the peripheral section 12b of the clad is not subjected to the irradiation of the laser beam and therefore it remains a flat surface which crosses at right angles to the axial length direction.

Hence, the projecting lens section 13', is formed on the end surface of the optical fiber as shown in FIG. 5, the boundary between the core and the clad thereof also having a curved surface and the effective lens diameter d2 thereof being larger than the diameter of the core 11.

Thus, the resulting shape of the lens 13' which is formed by changing the lens section 11' shaped in the truncated cone into a curved surface also depends on the power of the irradiated laser beam and the original truncated cone shape. The apex angle falls within a range of 100° to 120°, and the radius of the curvature of a top section 13'b should be set within a range of 2 to 10 μm.

When the lens section 13 shown in FIG. 10 is compared with the lens section 13' shown in FIG. 11, the lens section shown in FIG. 11 is better from the standpoint of the efficiency of coupling to a semiconductor laser chip.

Figure 12:
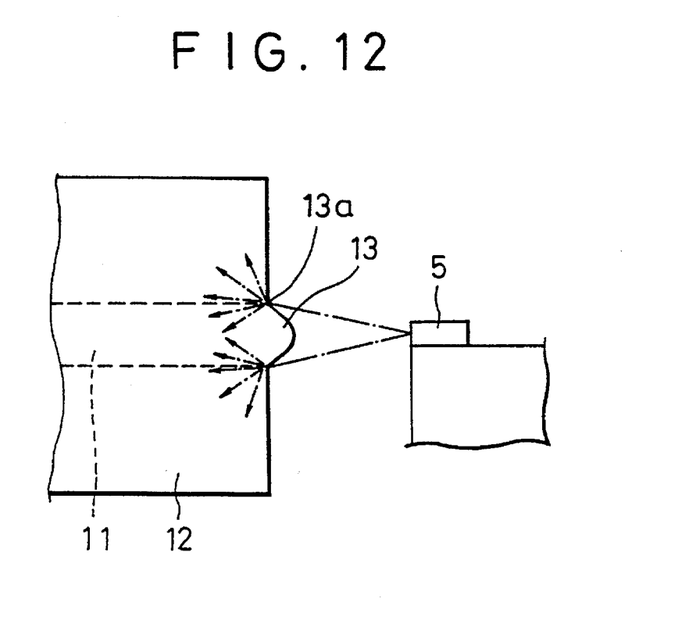
FIG. 12 is a side view which shows a state wherein the lens section of FIG. 10 and the semiconductor laser chip are coupled and subjected to the irradiation of a laser beam.

For instance, if an optical fiber having the lens section 13 shown in FIG. 10 is coupled to a semiconductor laser chip, a laser beam emitted from the semiconductor laser chip 5 scatters at the base 13a as shown in FIG. 12 because the base 13a of the lens section 13 has its flat surface edge bent. This means the area where the scattered light takes place suffers from a drop in the coupling efficiency.

Figure 13:
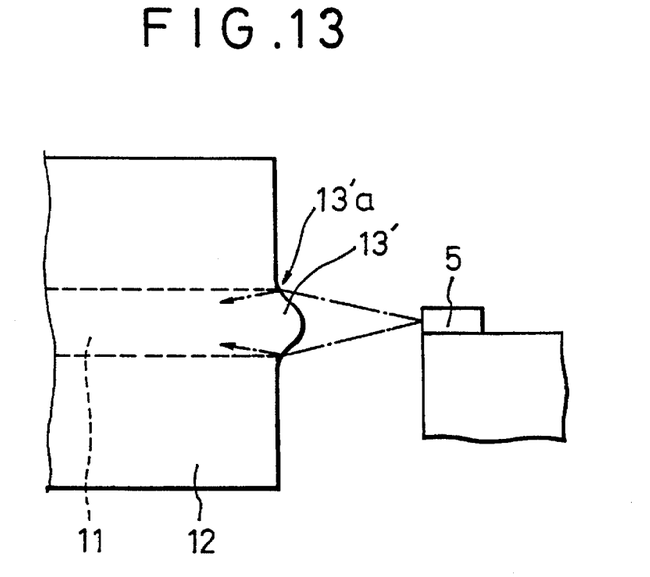
FIG. 13 is a side view which shows a state wherein the lens section of FIG. 11 and the semiconductor laser chip are coupled and subjected to the irradiation of a laser beam.

On the other hand, in the case of the optical fiber with the lens section 13' shown in FIG. 11, the foot 13'a of the lens section 13' has a diameter larger than that of the core 11 and it is shaped in a curved surface. Therefore, as shown in FIG. 13, the laser beam entering this foot 13'a is refracted toward the core 11. This results in higher coupling efficiency.

In this case, as the diameter of the foot in the lens section 13', namely, the effective lens diameter d2, is set larger than the diameter of the core, the coupling efficiency increases accordingly. However, even if the effective lens diameter d2 is increased to 1.5 or more times the diameter of the core 11, the coupling efficiency is hardly improved; therefore, it is desirable to set the effective lens diameter d2 to about 1.2 to 1.5 times the diameter of the core.

The quartz-based optical fiber with a lens shown in FIG. 6 is manufactured as set forth below.

First, the third optical fiber is mirror-cut and the cut end surface is polished if necessary.

Then the end surface is immersed in the hydrofluoric acid-based mixture solution.

Figure 14:
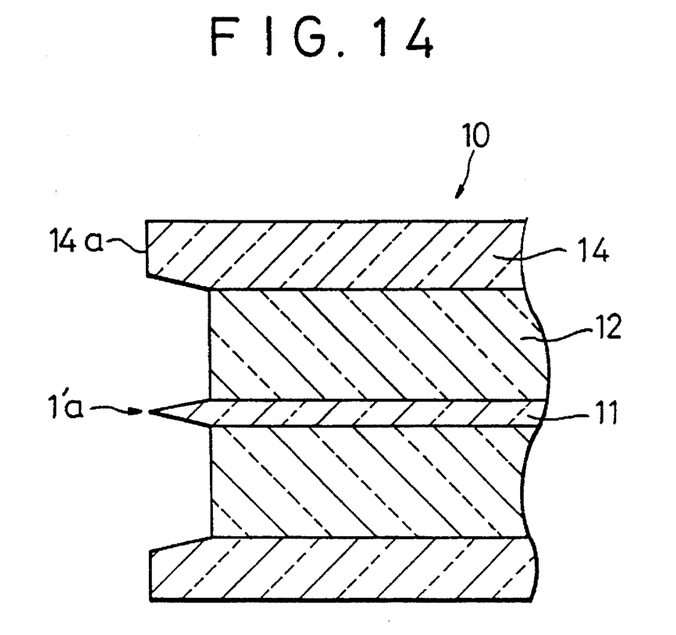
FIG. 14 is a cross-sectional view which shows the end surface of the quartz glass with an outer peripheral section, the end surface having been treated with the hydrofluoric acid solution.

The core 11, the clad 12, and the outer peripheral section 14 are etched since they are all made of quartz-based glass. At this time, the etching speed of the clad 12 is higher than that of the core 11 and the outer peripheral section 14; therefore, after a prescribed time elapses, the clad 12 is etched relatively more compared with the core 11 and the outer peripheral section 14 as shown in FIG. 14. As a result, the clad 12, which is sunken in a donut-shape, the core 11, which conically projects at the center of the clad, and the outer peripheral section 14, which annularly projects around the clad 12 at the same height as the aforesaid core 11, are formed.

Then, a condensing laser beam is irradiated by a $CO_2$ laser, for example, to the end of the conical core 11 projecting at the center to locally heat it, thus melting and forming it into a spherical shape. As a result, as shown in FIG. 6, the conical end of the core 11 is shaped into a sphere to form the lens section 13 (13'). In this process, the projection from the end surface 12a of the clad 12 is made shorter. This means that the end of the lens section 13 (13') recedes from the position of the end surface 14a of the outer peripheral section 14.

EMBODIMENT 1

A quartz-based optical fiber was prepared, the core thereof being a pure quartz glass and the clad thereof being a quartz glass composed of a pure quartz glass doped with fluorine, the core diameter being 9 μm, the clad diameter being 125 μm, and a difference in refractive index between the two being 0.3%.

The optical fiber was cut at right angles with respect to the lengthwise direction, the cut surface was polished, and the end surface was machined so that it crosses at right angles to the axial length direction.

Subsequently, the end of the optical fiber was immersed, by approximately 1 mm in length, in a circulating hydrofluoric acid aqueous solution (the liquid temperature: 25° C.) of a 50% concentration for about 30 minutes.

Formed on the end surface of the optical fiber was the projecting core 11' in the truncated cone shape, which had an apex angle of about 100° and a height of about 4 μm, the diameter of the top section 11'b being about 1 μm as shown in FIG. 8.

The obtained optical fiber was set on the positioning stage 15a shown in FIG. 9, and a $CO_2$ laser beam (irradiation power: approximately 1.2 W) having a spot diameter of about 40 μm was irradiated to the end surface of the optical fiber for about 5 seconds. At this time, a part of the beam emitted from the $CO_2$ laser was branched for power monitoring and a polarizing plate was turned to control the power fluctuation in the beam emitted from the laser to ±1 mW or less, thereby ensuring stable emitted beam power.

On the end surface of the optical fiber was formed the lens section 13 having the shape as shown in FIG. 10. The lens section 13 had an apex angle of about 100° and a height of about 3 μm, the curvature radius of the top section 13b being about 5 μm and the diameter (effective lens diameter) of the base 13a being about 14 μm.

The optical fiber and a semiconductor laser chip were coupled. The clad end surface was a flat surface and the end of the lens is located about 3 μm from the clad end surface. This made it possible to easily determine the gap between the clad end surface and the semiconductor laser chip by using the clad end surface 12a as the positioning reference. The coupling efficiency after coupling was approximately 90%.

EMBODIMENT 2

A quartz-based optical fiber was prepared, the core thereof being made of a glass composed of a pure quartz glass doped with $GeO_2$ and the clad thereof being made of a pure quartz glass, the core diameter being 9 μm, the clad diameter being 125 μm, and a difference in refractive index between the two being 0.3%. This optical fiber was subjected to the end surface machining in the same manner as in Embodiment 1.

A hydrofluoric acid aqueous solution having a 50% hydrofluoric acid concentration and an ammonium fluoride aqueous solution composed of 150 g of ammonium fluoride dissolved in 250 cc of water were mixed at a volume ratio of 9:1 to prepare a mixed solution.

The end surface of the aforesaid optical fiber was immersed in this mixed solution (liquid temperature: 25° C.) for about 30 minutes.

Formed on the end surface of the optical fiber was a projecting core in the truncated cone shape which had an apex angle of about 110°, and a height of about 4 μm, and a diameter of about 1 μm. A $CO_2$ laser beam (irradiation power: approximately 1.2 W) having a spot diameter of about 40 μm was irradiated to the end surface of the optical fiber for about 5 seconds.

On the end surface of the optical fiber was formed the lens section 13' as shown in FIG. 11. The lens section 13' had an apex angle of about 100° and a height of about 3 μm, the curvature radius of the top section 13'b being about 5 μm and the diameter (effective lens diameter) of the foot 13'a being about 14 μm.

When the optical fiber and a semiconductor laser chip were coupled, the coupling efficiency was approximately 90%.

EMBODIMENT 3

A quartz-based optical fiber was prepared, the core 11 thereof was made of a quartz glass doped with $GeO_2$ and had a 10 μm diameter, and the clad 12 thereof was made of a pure quartz glass and had a 70 μm outer diameter, a difference in refractive index between the core 11 and the clad 12 being 0.3% and the diameter of the outer peripheral section made of the same material as the core 11 being 125 μm.

The optical fiber was mirror-cut and the cut surface was immersed for about 30 minutes in a mixed solution consisting of a 50% hydrofluoric acid solution and a saturated ammonium fluoride aqueous solution mixed at a volume ratio of 1:3. An optical fiber as shown in FIG. 14 was obtained, wherein the end of the core 11 was conically shaped, the clad 12 was sunken, and the conical end of the core 11 and the end surface 14a of the outer peripheral section 14 were approximately flush.

Subsequently, a $CO_2$ laser beam (irradiation power: 1.2 W) having a spot diameter of 40 μm was irradiated to the conical end of the core 11 to form the spherical lens section 13 as shown in FIG. 6. The end of the spherical lens 13 was receded from the end surface 14a of the outer peripheral section 14 by about 2 μm.

The end surface 14a of the quartz-based optical fiber with a lens was applied to the end surface 5b, excluding the luminous surface 5a in the semiconductor laser chip 5, and the relative positions of the two were adjusted to ensure a maximum coupling optical power. When the maximum coupling optical power was obtained, the contacting surfaces of the two were fixed with solder to fix their positions. The coupling efficiency was 90%.

During the process, the luminous surface 5a incurred no damage, and it was possible to operate them with the constant coupling efficiency.

What is claimed is:

1. A quartz-based optical fiber with a lens comprising:

a core which is comprised of a first quartz-based glass, a clad which surrounds the core, the clad being comprised of a second quartz-based glass, the first quartz-based glass of the core having a lower etching speed with respect to a hydrofluoric acid etching solution than that of the second quartz-base glass of the clad, the core forming a lens section with a curved surface projecting from an end surface of the clad, and said clad being free of any tapered portion, at least one portion of the end surface of the clad being a flat surface and which is perpendicular to an axial length direction of the optical fiber.

2. The quartz-based optical fiber with a lens according to claim 1, wherein said core is made of a pure quartz glass and said clad is made of a quartz-based glass which is a quartz glass doped with a fluorine component and/or a phosphorus component.

3. The quartz-based optical fiber with a lens according to claim 1, wherein said core is made of a glass comprised of a quartz glass doped with a germanium component and said clad is made of a pure quartz glass.

4. The quartz-based optical fiber with a lens according to claim 1, wherein a difference in refractive index between said core and said clad is from 0.3 to 0.4%.

5. The quartz-based optical fiber with a lens according to claim 1, wherein the lens section extends from said curved surface beyond a boundary area between said core and said clad in said end surface.

6. The quartz-based optical fiber with a lens according to claim 5, wherein the effective lens diameter of said lens section is 1.0 or more to 1.5 or less times the diameter of said core.

7. The quartz-based optical fiber with a lens according to claim 1, wherein an outer peripheral section, which consists of a quartz-based glass having a lower etching speed with respect to a hydrofluoric acid solution than that of the second quartz-based glass of the clad, is formed around said clad into one body and said lens section is receded from an end surface of said outer peripheral section.

8. The quartz-based optical fiber with a lens according to claim 7, wherein said outer peripheral section and said core are both made of the same quartz-based glass.

9. The quartz-based optical fiber with a lens according to claim 2, wherein a difference in refractive index between said core and said clad ranges from 0.3 to 0.4%.

10. The quartz-based optical fiber with a lens according to claim 3, wherein a difference in refractive index between said core and said clad ranges from 0.3 to 0.4%.

11. The quartz-based optical fiber with a lens according to claim 5, wherein an outer peripheral section, which consists of a quartz-based glass having a lower etching speed with respect to a hydrofluoric acid solution than that of the second quartz-based glass of the clad, is formed around said clad into one body and said lens section is receded from an end surface of said outer peripheral section.

12. The quartz-based optical fiber with a lens according to claim 11, wherein said outer peripheral section and said core are both made of the same quartz-based glass.

13. The quartz-based optical fiber with a lens according to claim 1, wherein the lens has a diameter which is about one tenth of the diameter of the clad.

14. The quartz-based optical fiber with a lens according to claim 1, wherein the hydrofluoric acid concentration is 10 to 50 mol % and the etching is carried out at a temperature of 20° to 25° C. for 30 to 60 minutes.

15. The quartz-based optical fiber with a lens according to claim 1, wherein the lens has an apex angle of 100° to 120° and a radius of curvature of a top section thereof of 2 to 10 μm.

* * * * *